United States Patent
Torii et al.

[11] Patent Number: 5,818,358
[45] Date of Patent: Oct. 6, 1998

[54] DEVICE FOR DETECTING POSITION OF MOVING BODY

[75] Inventors: Katsuhiko Torii, Shizuoka-ken; Kengo Yamamura, Kosai; Mitsuhiro Ikeya, Hamamatsu; Wataru Kano, Toyota, all of Japan; Tatsuya Suzuki, West Bloomfield, Mich.

[73] Assignee: Asmo Co., Ltd., Japan

[21] Appl. No.: 795,781

[22] Filed: Feb. 5, 1997

[30] Foreign Application Priority Data

| Feb. 9, 1996 | [JP] | Japan | 8-024197 |
| Feb. 29, 1996 | [JP] | Japan | 8-043621 |
| Mar. 1, 1996 | [JP] | Japan | 8-045189 |

[51] Int. Cl.⁶ .......................... H03M 1/22; H01H 21/28
[52] U.S. Cl. ..................... 341/16; 200/47; 318/468
[58] Field of Search ................ 341/16; 318/466, 318/468, 626, 652; 200/47, 501; 307/10.1

[56] References Cited

U.S. PATENT DOCUMENTS

| 3,659,083 | 4/1972 | Winter et al. | 235/92 |
| 3,735,325 | 5/1973 | Akashi | 338/164 |
| 4,350,938 | 9/1982 | Ecole | 318/466 |

FOREIGN PATENT DOCUMENTS

| 0 644 402A1 | 3/1995 | European Pat. Off. . |
| 0 684 452 A2 | 11/1995 | European Pat. Off. . |
| 8-29114 | 2/1996 | Japan . |

*Primary Examiner*—Howard L. Williams
*Attorney, Agent, or Firm*—Parkhurst & Wendel

[57] ABSTRACT

A device for detecting a position of a moving body is provided in which a position of a moving body such as a window glass of a power window device can be detected with high accuracy, initial positions can be set without complicated adjustment, such can be realized with a simple structure and at a low cost, and assemblability can be greatly improved. In the device for detecting a position of a moving body, fixed contacts press-contact a flange portion of a ring gear from a side opposite a side at which a cover plate is disposed. Accordingly, the fixed contacts can be installed after the ring gear. In a state in which the ring gear is provisionally installed, press-contact force of the fixed contacts is not applied to the ring gear. As a result, the ring gear does not rise and positional deviation does not occur, and therefore, the assemblability can be greatly improved.

20 Claims, 18 Drawing Sheets

F I G. 7
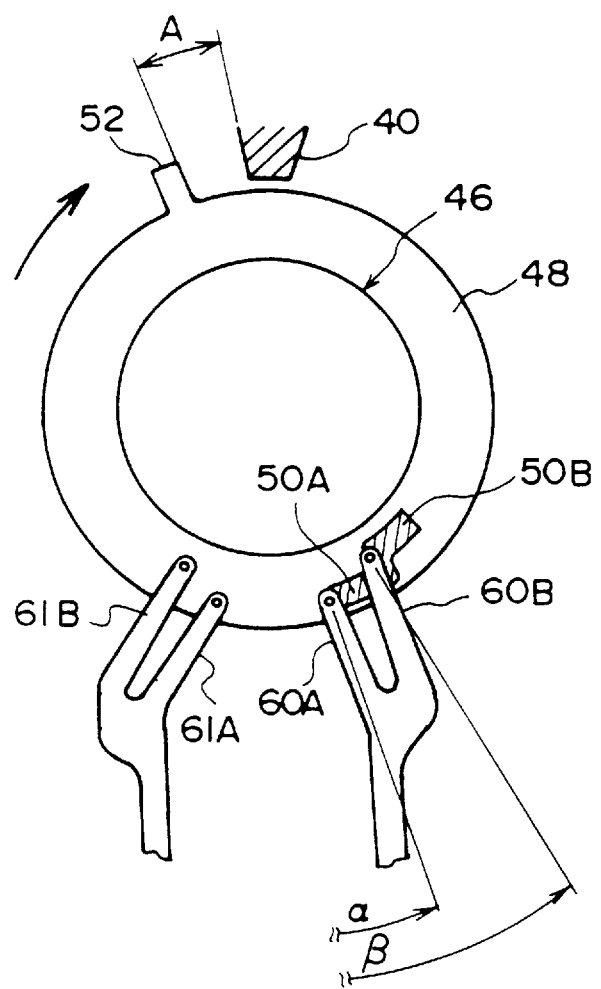

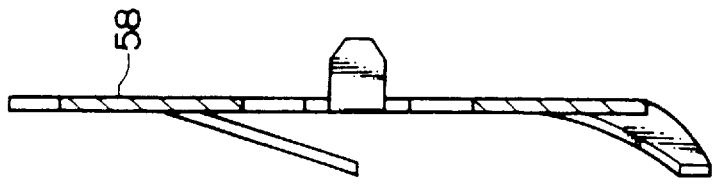
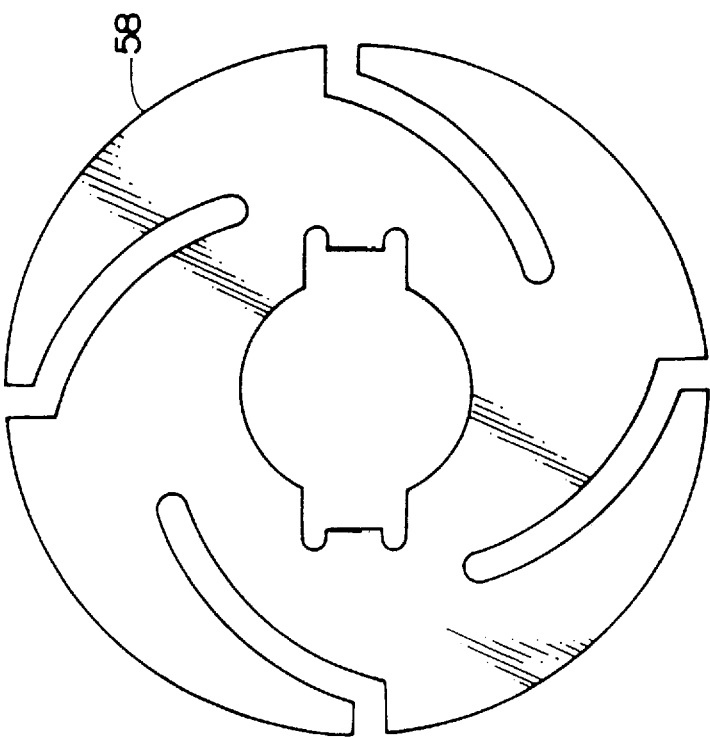

F I G. 12A
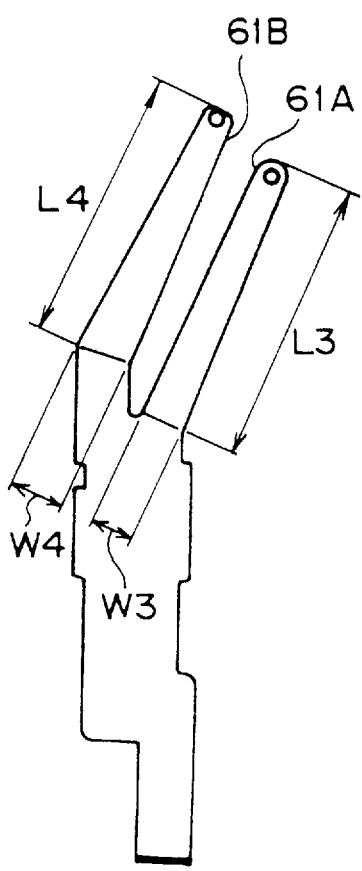
F I G. 12B
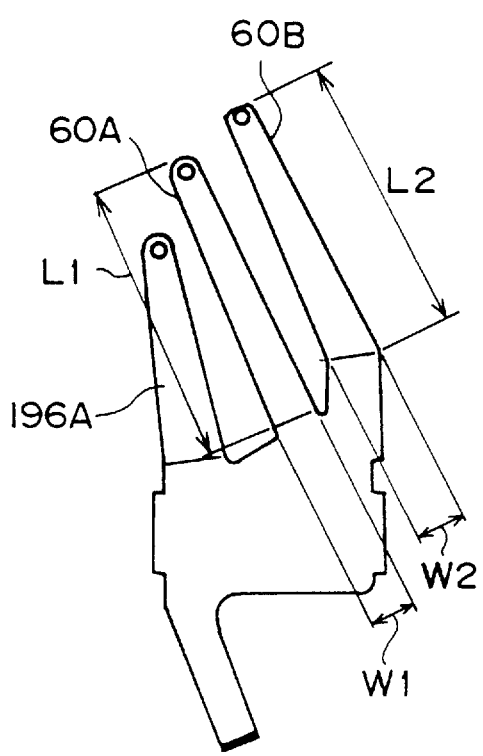

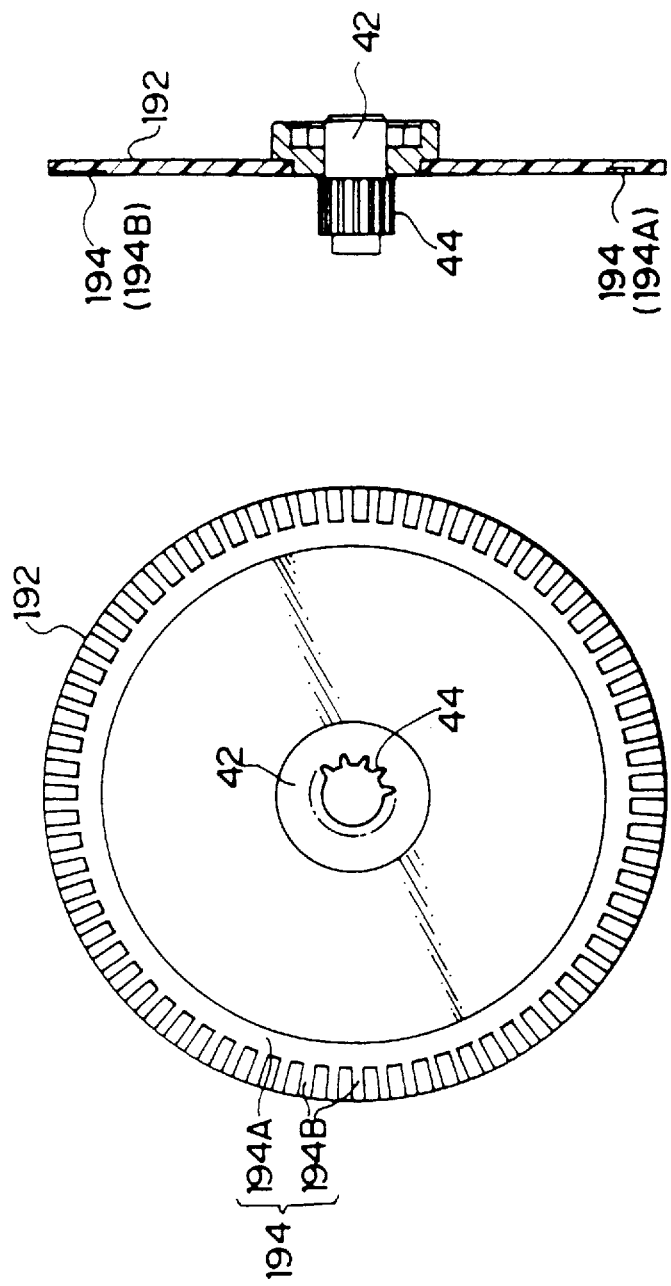

DEVICE FOR DETECTING POSITION OF MOVING BODY

BACKGROUND OF THE INVENTION

1. Field of the Invention

The present invention relates to a device for detecting a position of a moving body which device is used in a power window device, which moves a window glass of a vehicle door to open and close the window glass, or is used in a sunroof device, which moves a sunroof to open and close the sunroof, or the like.

2. Description of the Related Art

A motor is used as the drive source in a power window device, which moves a window glass of a vehicle down and up to open and close the window glass, or in a sunroof device, which moves a sunroof to open and close the sunroof.

There are power window devices which have a so-called catch-preventing function which prevents a portion of the body of a vehicle occupant or a foreign object from being inadvertently caught between the window glass and the window frame of the vehicle door. The following two types of structures are examples of power window devices equipped with such a catch-preventing function. (1) A limit switch is disposed at a predetermined position of the door. On the basis of signals from the limit switch and the lock current of the motor, a determination is made as to whether a foreign object has been caught by the window glass, and the movement of the window glass, i.e., the rotational position of the motor, is controlled appropriately. (2) The rotational frequency of the armature is detected by providing a Hall IC or a special commutator. On the basis of the rotational frequency detection signal (the number of pulses or the pulse width of the pulse signal), a determination is made as to whether a foreign object has been caught, and the rotational position of the motor is controlled appropriately.

However, in such power window devices (motor rotational position detecting mechanisms), a drawback arises in that complicated adjustment of the installation positions while the motor and the window regulator and the like are being installed or complex resetting after installation is needed. Further, in cases in which a catch-preventing mechanism is used, there is a drawback in that parts such as a control device or the like are expensive and are imprecise.

The inventors of the invention disclosed in the present application have proposed devices for detecting a position of a moving body in order to overcome the aforementioned drawbacks (e.g., Japanese Patent Application Laid-Open (JP-A) No. 8-29114).

This device for detecting a position of a moving body includes a planetary gear group, a switch portion and a clutch mechanism. The planetary gear group is formed by a ring gear rotatably held at the cover plate of the device and a planetary gear meshing with the ring gear. The switch portion is formed by a moving contact, which is provided integrally with the ring gear of the planetary gear group and rotates with the ring gear, and fixed contacts, which are fixed to the cover plate and are able to contact the moving contact. The clutch mechanism cuts off transmission of forward direction rotational force from the moving body (the motor output shaft) to the ring gear. In this way, when the position detecting device is used in a power window device or a sunroof device, the position of the window glass or the sunroof can be detected with high accuracy and the movement thereof can be controlled. Moreover, the initial positions can be set without complicated adjustment, and these features can be realized with a simple structure and at a low cost.

In the above-described device for detecting a position of a moving body, the parts such as the clutch mechanism, the ring gear, the planetary gear, and the like are sequentially installed coaxially with a predetermined axis corresponding to the moving body (the motor output shaft), with the cover plate of the device used as a reference. When assembly is completed, the moving contact which is provided integrally with the ring gear is in a state of press-contacting the fixed contacts which are fixed to the cover plate.

However, the urging force (press-contact force) of the fixed contacts is applied to the moving contact also at the time when the ring gear is being provisionally installed. Therefore, when the clutch mechanism and the ring gear are being provisionally installed with respect to the cover plate, due to the urging force (press-contact force) of the fixed contacts, the ring gear rises upward and the axis is shifted, which may impede precise positioning during provisional assembly and lead to a deterioration of the assemblability. Accordingly, in order to accurately install the ring gear coaxially with the predetermined axis with the cover plate as a reference, assembly must be carried out cautiously, and there is therefore room for improvement with respect to this point.

Further, in the above-described device for detecting a position of a moving body, the rotation of the ring gear is repeated to the extent that the moving body (the window glass or the sunroof) moves. More specifically, sliding of the moving contact provided integrally with the ring gear and of the pair of fixed contacts is repeated. When the contacts become worn due to repeated sliding of the moving contact and the fixed contacts, the reliability and precision of the position detecting device deteriorate. Therefore, measures should be taken so that wearing down of the contacts does not progress.

The above-described device for detecting a position of a moving body is applicable to, for example, a vehicle power window device. The vehicle power window devices are structured symmetrically at the left and the right of the vehicle, i.e., the basic structures are symmetrical at the right side door and the left side door. Accordingly, when the above-described conventional device for detecting a position of a moving body is used for such vehicle power window devices or for the drive motors thereof, independent (exclusive) parts must be provided for each of the right side door and the left side door because the rotational directions of the ring gears and the like of the right side door and the left side door are different.

Accordingly, the number of parts increases, and the scope of application is limited. A countermeasure to this drawback is therefore also desired.

SUMMARY OF THE INVENTION

In view of the aforementioned, a first object of the present invention is to provide a device for detecting a position of a moving body in which the position of a moving body such as a window glass or a sunroof can be detected with high accuracy, initial positions can be set without complicated adjustment, these features can be realized with a simple structure and at a low cost, and further, the assemblability is greatly improved.

A second object of the present invention is to provide a device for detecting a position of a moving body in which the position of a moving body such as a window glass or a sunroof can be detected with high accuracy, initial positions can be set without complicated adjustment, these features can be realized with a simple structure and at a low cost, and further, durability (wear resistance) is improved, wear of a moving contact and fixed contacts is decreased, and high accuracy of position detection and reliability are maintained.

A third object of the present invention is to provide a device for detecting a position of a moving body in which the position of a moving body such as a window glass or a sunroof can be detected with high accuracy, initial positions can be set without complicated adjustment, these features can be realized with a simple structure and at a low cost, and further, the number of parts can be decreased and the range of application can be broadened.

In accordance with a first aspect of the present invention, in order to achieve the aforementioned first object, there is provided a device for detecting a position of a moving body for detecting a predetermined position of a moving body, comprising: a planetary gear group having a ring gear which is held rotatably at a cover plate of the device and a planetary gear which meshes with the ring gear, the planetary gear group being operated interlockingly with the moving body due to moving force transmitted from the moving body which moves in forward and reverse directions; a switch portion having a moving contact provided integrally with the ring gear of the planetary gear group and rotating together with the ring gear, and having a fixed contact fixed to the cover plate and able to contact the moving contact, the switch portion able to detect the predetermined position of the moving body due to on-and-off operation of the switch portion; and a clutch mechanism which usually, by preventing revolution of the planetary gear of the planetary gear group, transmits the moving force of the moving body from the planetary gear to the ring gear so as to rotate the ring gear, and in a state in which the switch portion is operated, the clutch mechanism cuts off transmission of forward direction rotating force from the moving body to the ring gear by permitting revolution of the planetary gear, wherein the fixed contact of the switch portion is made to press-contact the moving contact from a side of the ring gear which side is opposite the side at which the cover plate is disposed.

In the device for detecting a position of a moving body of the first aspect of the present invention, usually, revolution of the planetary gear of the planetary gear group is prevented by the clutch mechanism. When the moving body rotates in forward and reverse directions, the moving force is transmitted to the planetary gear and the ring gear, and the ring gear is rotated interlockingly with the moving body. When the moving body reaches a predetermined position, the moving contact which rotates together with the ring gear separates from the fixed contact so as to operate the switch portion. The predetermined position of the moving body is thereby detected.

When the switch portion is in an operating state (e.g., when the moving contact contacts the fixed contact), revolution of the planetary gear is permitted by the clutch mechanism, and transmission of the forward direction rotational force from the moving body to the ring gear is cut off. More specifically, even if the moving body rotates in the forward direction after the switch portion is operated, the ring gear does not move, and the switch portion remains in the operating state (e.g., the state in which the moving contact contacts the fixed contact). Namely, due to the moving body being rotated sufficiently in the forward direction, the initial state in which the switch portion is operated (e.g., an initial state in which the moving contact contacts the fixed contact) is set automatically.

Accordingly, for example, in a case in which the position detecting device is used in a vehicle power window device having a catch-preventing function or in a drive motor of such a vehicle power window device, at the time of assembly to the vehicle body, by rotating the output shaft of the motor sufficiently in the forward direction, the initial state in which the switch portion is operated (e.g., an initial state in which the moving contact contacts the fixed contact) is set automatically. Initial positions can be set easily without complicated adjustment of the installation positions at the time of assembly or complicated resetting after assembly. Further, in a structure in which the rotational frequency of the armature of the motor for driving a power window device is detected by using a Hall IC or the like and the position of the motor rotational shaft, i.e., the position of the window glass, is detected, a counter is indispensable to the control circuit. However, in the position detecting device of the present invention, the accurate position can be discriminated by a single ON/OFF signal. There is no need for a counter in a control circuit, and the position detecting device is less expensive.

Further, in the device for detecting a position of a moving body of the first aspect of the present invention, the fixed contact fixed to the cover plate press-contacts the moving contact from the side of the ring gear opposite the cover plate. More specifically, when the ring gear is provisionally installed by using the cover plate as a reference, the fixed contact can be installed after the ring gear. As a result, in a state in which the ring gear is provisionally installed, urging force (press-contact force) of the fixed contact is not applied to the ring gear. Accordingly, in its provisionally installed state, the ring gear does not rise, and the axis does not shift. Further, in the state in which the ring gear and the fixed contact are provisionally installed, the urging force (press-contact force) of the fixed contact is applied to the moving contact (ring gear), but the urging force (press-contact force) of the fixed contact is applied in a direction of pushing the ring gear toward the cover plate. Accordingly, in this state as well, the ring gear is reliably held due to the urging force (press-contact force) of the fixed contact and does not rise up, and the axis does not shift. In this way, accurate positioning at the time of installing the ring gear is not prevented, and the assemblability is greatly improved.

In a device for detecting a position of a moving body of a second aspect of the present invention, the device for detecting a position of a moving body of the first aspect further includes a pulse generating means, which is provided at the planetary gear group and generates pulses in accordance with operation of the planetary gear group, and a pulse detecting means, which detects the pulses generated by the pulse generating means.

In the device for detecting a position of a moving body of the second aspect of the present invention, the pulses, which are generated by the pulse generating means in accordance with the operation of the planetary gear group, are detected by the pulse detecting means. Because the planetary gear group is interlocked with the moving body, the position of the moving body can be detected linearly on the basis of the detected pulse signal.

Accordingly, in a case in which, for example, the position detecting device is used in a vehicle power window device equipped with a catch-preventing function, the position of the window glass can be detected at all times.

In accordance with a third aspect of the present invention, in order to achieve the above-described second object, there is provided a device for detecting a position of a moving body for detecting a predetermined position of a moving body, comprising: a planetary gear group having a ring gear which is held rotatably at a cover plate of the device and a planetary gear which meshes with the ring gear, the planetary gear group being operated interlockingly with the moving body due to moving force transmitted from the moving body which moves in forward and reverse directions; a switch portion having a moving contact provided integrally with the ring gear of the planetary gear group and rotating together with the ring gear, and having a pair of fixed contacts fixed to the cover plate and able to contact the moving contact, the switch portion able to detect the predetermined position of the moving body due to on-and-off operation of the switch portion; and a clutch mechanism which usually, by preventing revolution of the planetary gear of the planetary gear group, transmits the moving force of the moving body from the planetary gear to the ring gear so as to rotate the ring gear, and in a state in which the switch portion is operated, the clutch mechanism cuts off transmission of forward direction rotating force from the moving body to the ring gear by permitting revolution of the planetary gear, wherein positions at which the pair of fixed contacts of the switch portion contact the moving contact are offset from one another in a radial direction of the ring gear such that loci of sliding of the fixed contacts are respectively different.

In accordance with the third aspect of the present invention, in the same way as in the device for detecting a position of a moving body of the first aspect, the respective press-contact positions of the pair of fixed contacts against the moving contact are offset in the radial direction of the ring gear, and the loci of sliding of the contacts are respectively different. As a result, the durability (wear resistance) of the moving contact and the pair of fixed contacts is improved. Even in a case in which rotation of the ring gear is repeated and sliding of the moving contact and the pair of fixed contacts is repeated to the extent that the moving body (the window glass or the sunroof) moves, wear of the moving contact and the fixed contacts is reduced. Accordingly, high accuracy of position detection and reliability can be maintained.

In a device for detecting a position of a moving body of a fourth aspect of the present invention, in the device for detecting a position of a moving body of the third aspect, the pair of fixed contacts are formed in respectively different configurations, and have respectively different spring constants.

In the device for detecting a position of a moving body of the fourth aspect of the present invention, because the pair of fixed contacts have respectively different spring constants, the fixed contacts can be prevented from resonating together at the same vibrational frequency. Accordingly, reliability can be greatly improved.

In a device for detecting a position of a moving body of a fifth aspect of the present invention, in the device for detecting a position of a moving body of either the third or the fourth aspect, the moving contact and the pair of fixed contacts form a contact group, and two contact groups are provided, and each contact group is able to independently detect the predetermined position of the moving body.

In the device for detecting a position of a moving body of the fifth aspect, a contact group is formed by a moving contact and a pair of fixed contacts, and two of these contact groups are provided independent of one another. Accordingly, it is possible to use one group as a main contact group and the other group as a sub contact group, and the reliability is greatly improved.

In a device for detecting a position of a moving body of a sixth aspect of the present invention, in the device for detecting a position of a moving body of the fifth aspect, the fixed contacts of the two contact groups are formed in respectively different configurations and have respectively different spring constants.

In the device for detecting a position of a moving body of the sixth aspect, the fixed contacts of the two contact groups have respectively different spring constants. Therefore, the fixed contacts can be prevented from resonating together at the same vibrational frequency, and accordingly, reliability is greatly improved.

In accordance with a seventh aspect of the present invention, in order to achieve the above-described third object, there is provided a device for detecting a position of a moving body for detecting a predetermined position of a moving body, comprising: a planetary gear group having a ring gear which is held rotatably at a cover plate of the device and a planetary gear which meshes with the ring gear, the planetary gear group being operated interlockingly with the moving body due to moving force transmitted from the moving body which moves in forward and reverse directions; a switch portion having a moving contact provided integrally with the ring gear of the planetary gear group and rotating together with the ring gear, and having a pair of fixed contacts fixed to the cover plate and able to contact the moving contact, the switch portion able to detect the predetermined position of the moving body due to on-and-off operation of the switch portion; and a clutch mechanism which usually, by preventing revolution of the planetary gear of the planetary gear group, transmits the moving force of the moving body from the planetary gear to the ring gear so as to rotate the ring gear, and in a state in which the switch portion is operated, the clutch mechanism cuts off transmission of forward direction rotating force from the moving body to the ring gear by permitting revolution of the planetary gear, wherein at least the pair of fixed contacts of the switch portion are shaped and disposed so as to have line symmetry with respect to an imaginary line passing through a center of the ring gear.

In accordance with the seventh aspect of the present invention, in a device for detecting a position of a moving body which is similar to that of the first aspect, at least the pair of fixed contacts of the switch portion are shaped and disposed so as to have line symmetry with respect to an imaginary line passing through the center of the ring gear. Therefore, for example, even if the position detecting device is applied to vehicle power window devices which are symmetrical at the left and right doors (i.e., even if the ring gears rotate in opposite directions at the left and right doors), the pair of fixed contacts can be applied to both the left and the right doors. Accordingly, the number of parts can be reduced, and the range of application is increased.

In a device for detecting a position of a moving body of the eighth aspect of the present invention, in the device for detecting a position of a moving body of the seventh aspect, the ring gear and the moving contact are shaped symmetrically at obverse and reverse surfaces of the ring gear.

In the device for detecting a position of a moving body of the eighth aspect, not only the pair of fixed contacts of the switch portion, but also the ring gear and the moving contact have symmetrical configurations at the obverse and reverse sides of the ring gear. Therefore, the ring gear and the moving contact can be used as parts for both a left and a right side of the vehicle. Accordingly, the number of parts can be reduced even more, and the range of application is increased.

In a device for detecting a position of a moving body of a ninth aspect of the present invention, in the device for detecting a position of a moving body of the seventh aspect or the eighth aspect, the ring gear has a flange portion at a peripheral side wall portion of the ring gear, and the moving contact is provided at the flange portion.

In the device for detecting a position of a moving body of the ninth aspect, because the moving contact is provided integrally with the ring gear which is interlocked with the moving body, the moving contact is reliably moved interlockingly with the moving body. Further, the moving contact together with the ring gear can be made to have a compact configuration.

In a device for detecting a position of a moving body of a tenth aspect of the present invention, in the device for detecting a position of a moving body of the ninth aspect, the ring gear and the flange portion are formed of the same material.

In the device for detecting a position of a moving body of the tenth aspect, because the ring gear and the flange portion are formed of the same material, manufacturing is easy. Further, if the ring gear and the flange portion are made of a metal material for example, warping due to high temperatures or changes over time or the like can be prevented, and durability improves.

In a device for detecting a position of a moving body of an eleventh aspect of the present invention, in the device for detecting a position of a moving body of the ninth aspect, the ring gear and the moving contact are formed of the same material.

In the device for detecting a position of a moving body of the eleventh aspect, the ring gear and the moving contact are formed of the same material. Therefore, if the ring gear and the moving contact are formed of a resin material for example, manufacturing is easy.

In a device for detecting a position of a moving body of a twelfth aspect of the present invention, in the device for detecting a position of a moving body of the eleventh aspect, the ring gear and the moving contact are formed integrally and continuously and of a resin material, and the flange portion is formed of a metal material.

In the device for detecting a position of a moving body of the twelfth aspect, because the ring gear and the moving contact are formed integrally and continuously of a resin material, the ring gear and the moving contact can be formed in a single resin molding process. Further, it is easy to maintain high accuracy (e.g., the surface roughness) or the like of the contact sliding portion of the moving contact. Further, because the flange portion is formed of a metal material, warping due to high temperatures or changes over time or the like can be prevented, and durability improves.

The above and other objects, features and advantages of the present invention will become apparent from the following description and claims taken in conjunction with the accompanying drawings in which preferred embodiments of the present invention are shown by way of illustrative example.

BRIEF DESCRIPTION OF THE DRAWINGS

The invention will now be described with reference to the accompany drawings wherein:

FIG. 7 is a plan view illustrating the corresponding relationship between the fixed contacts and the ring gear (moving contacts) of the position detecting device relating to the embodiment of the present invention;

FIG. 11A is a plan view illustrating the wave washer of the position detecting device relating to the embodiment of the present invention;

FIG. 11B is a sectional view illustrating the wave washer of the position detecting device relating to the embodiment of the present invention;

FIGS. 12A and 12B are plan views of the fixed contacts of the position detecting device relating to the embodiment of the present invention;

FIG. 13A is a plan view of a pulse plate and a connecting shaft of the position detecting device relating to the embodiment of the present invention;

FIG. 13B is a sectional view of the pulse plate and the connecting shaft of the position detecting device relating to the embodiment of the present invention;

DESCRIPTION OF THE PREFERRED EMBODIMENTS

Figure 2:
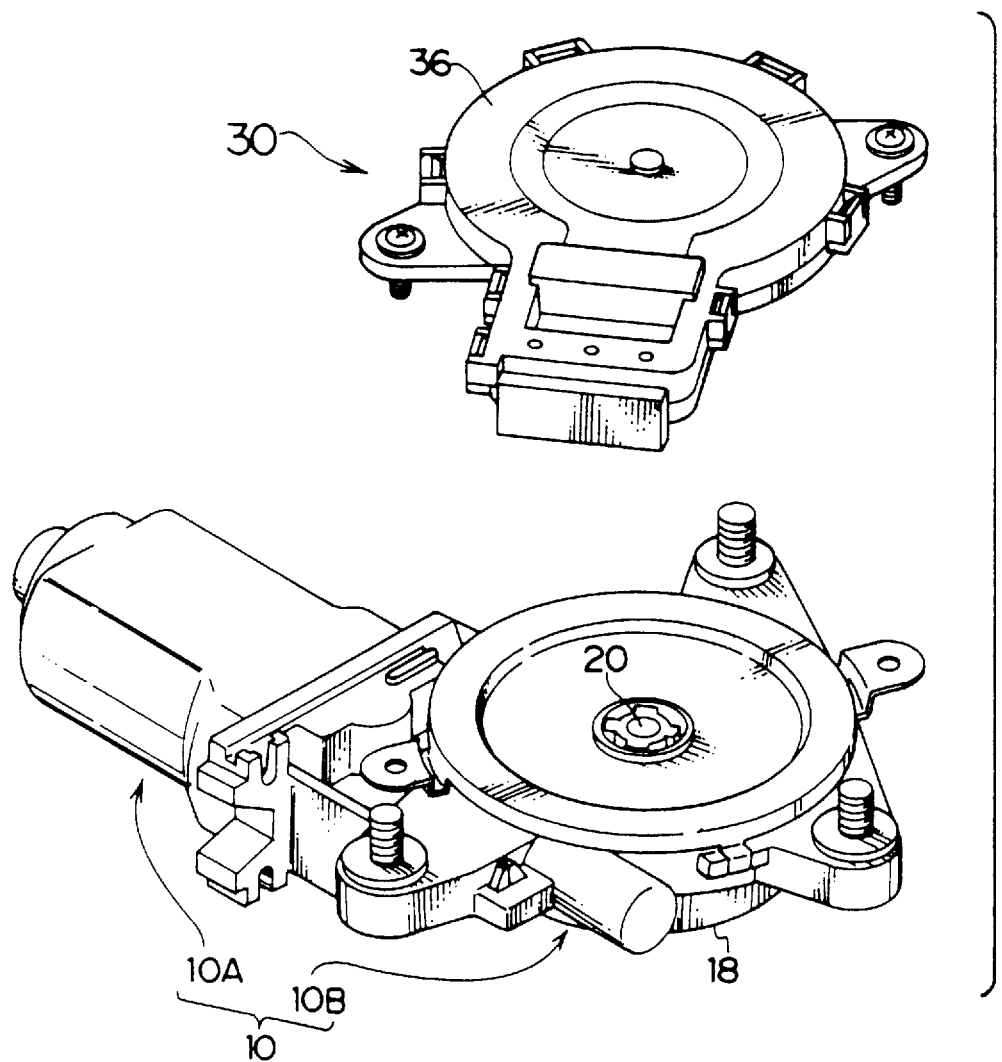
FIG. 2 is an overall perspective view of a motor for a power window device to which the position detecting device relating to the embodiment of the present invention is applied.
Figure 3:
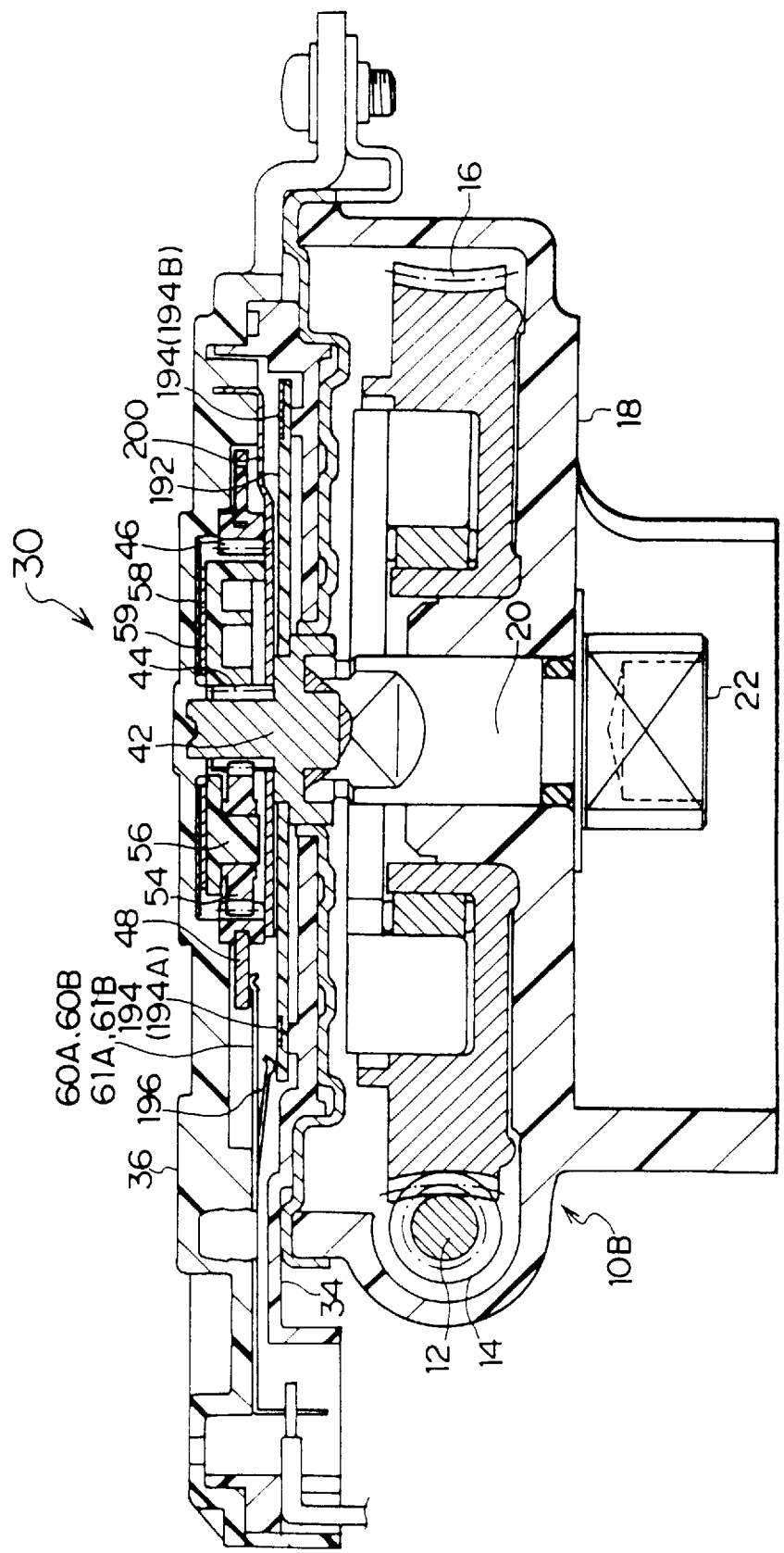
FIG. 3 is a sectional view of the position detecting device relating to the embodiment of the present invention and of the motor for the power window device to which the position detecting device is applied.

FIG. 2 is an overall perspective view of a position detecting device 30 relating to the embodiment of the present invention and of a motor 10 for a power window device to which the position detecting device 30 is applied. FIG. 3 is a cross-sectional view of the position detecting device 30 and the motor 10.

The motor 10 is formed by a motor portion 10A and a gear portion 10B connected to the motor portion 10A. A rotating shaft 12 of the motor portion 10A extends to the interior of the gear portion 10B, and a worm gear 14 is formed at the distal end of the rotating shaft 12. The worm gear 14 meshes with a rotating gear wheel 16 disposed within the gear portion 10B.

At the rotating gear wheel 16, a shaft 20 serving as a motor output shaft is rotatably supported at a cover 18 of the gear portion 10B. When the motor portion 10A is operated and the rotating shaft 12 rotates, the rotational force is transmitted to the rotating gear wheel 16 via the worm gear 14, and the shaft 20 is rotated. An output fitting portion 22 is provided at the distal end of the shaft 20 and is connected to the drive portion of a window regulator (not shown). In the present embodiment, for example, a window glass moves one stroke due to the shaft 20 (the output fitting portion 22) rotating 3 to 4.5 times.

The position detecting device 30 is attached to the surface of the gear portion 10B at the side opposite the output fitting portion 22.

Figure 1:
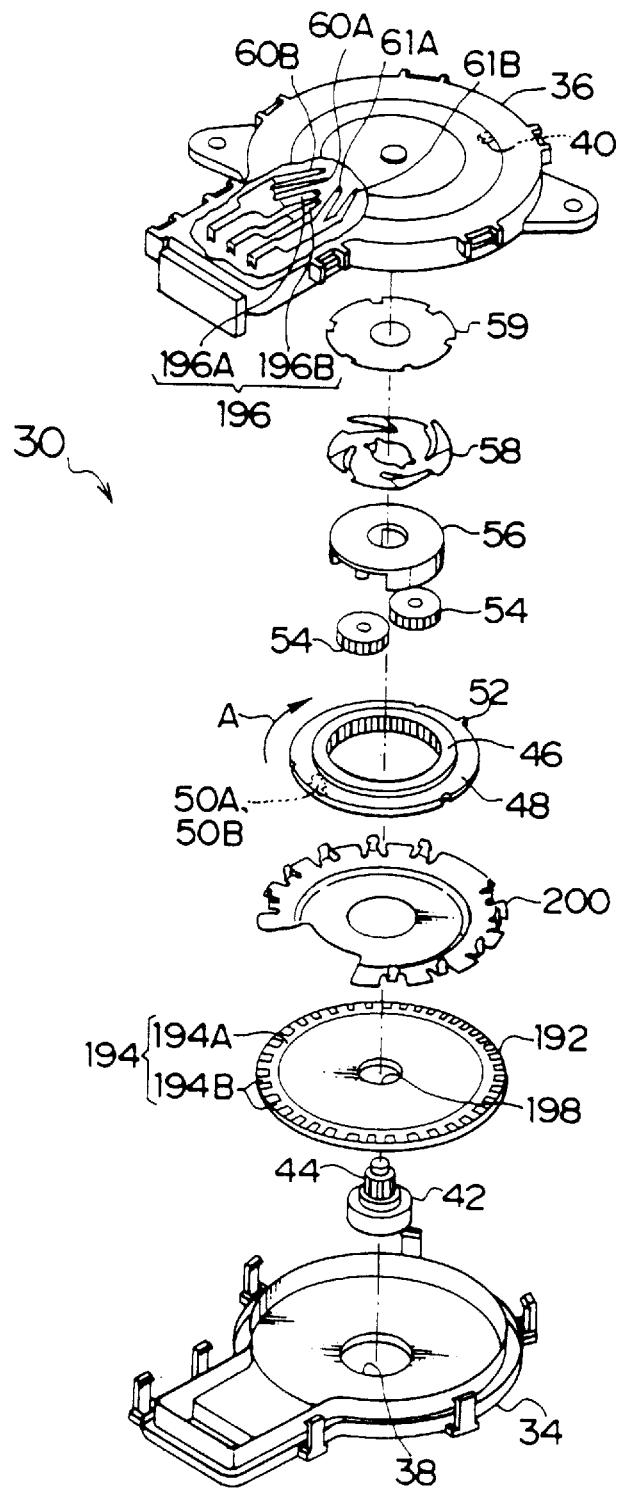
FIG. 1 is an exploded perspective view of a position detecting device relating to an embodiment of the present invention.

As illustrated in detail in FIG. 1, the position detecting device 30 includes a base plate 34 and a cover plate 36, and is formed thin and substantially cylindrical. A through hole 38 is formed in the central portion of the base plate 34. A projection 40 is formed at the inner peripheral surface of the cover plate 36 in the axial direction.

The position detecting device 30 has a connecting shaft 42. One end of the connecting shaft 42 is connected integrally to the shaft 20 of the rotating gear wheel 16 and always rotates integrally with the shaft 20. The other end of the connecting shaft 42 projects into the interior of the position detecting device 30 (into the interior of the base plate 34 and the cover plate 36) via the through hole 38 formed in the base plate 34. A sun gear 44 forming a portion of a planetary gear group is provided in a vicinity of this other end of the connecting shaft 42, and meshes with planetary gears 54 which will be described later.

Figure 5:
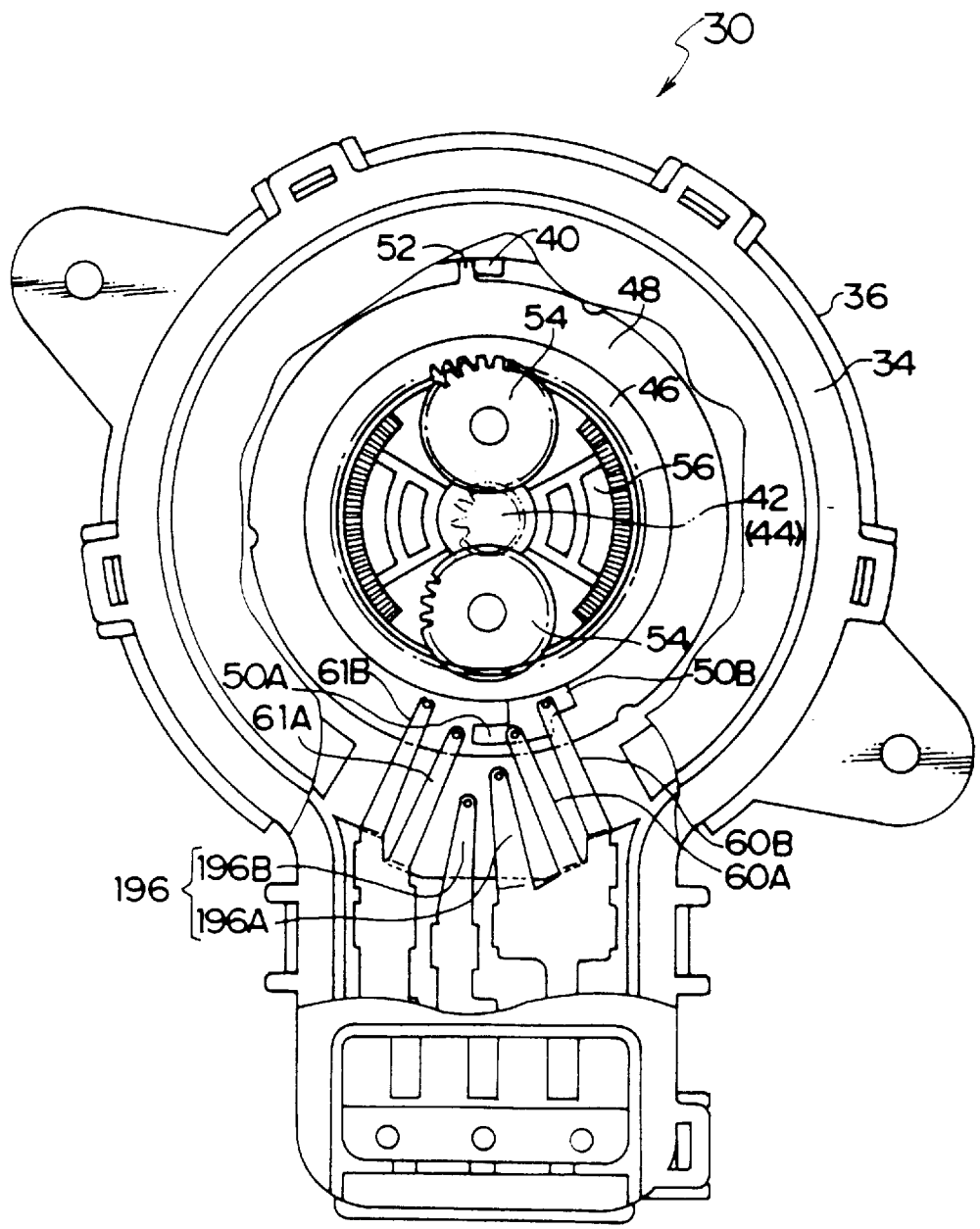
FIG. 5 is a partially broken plan view of the position detecting device relating to the embodiment of the present invention.
Figure 8:
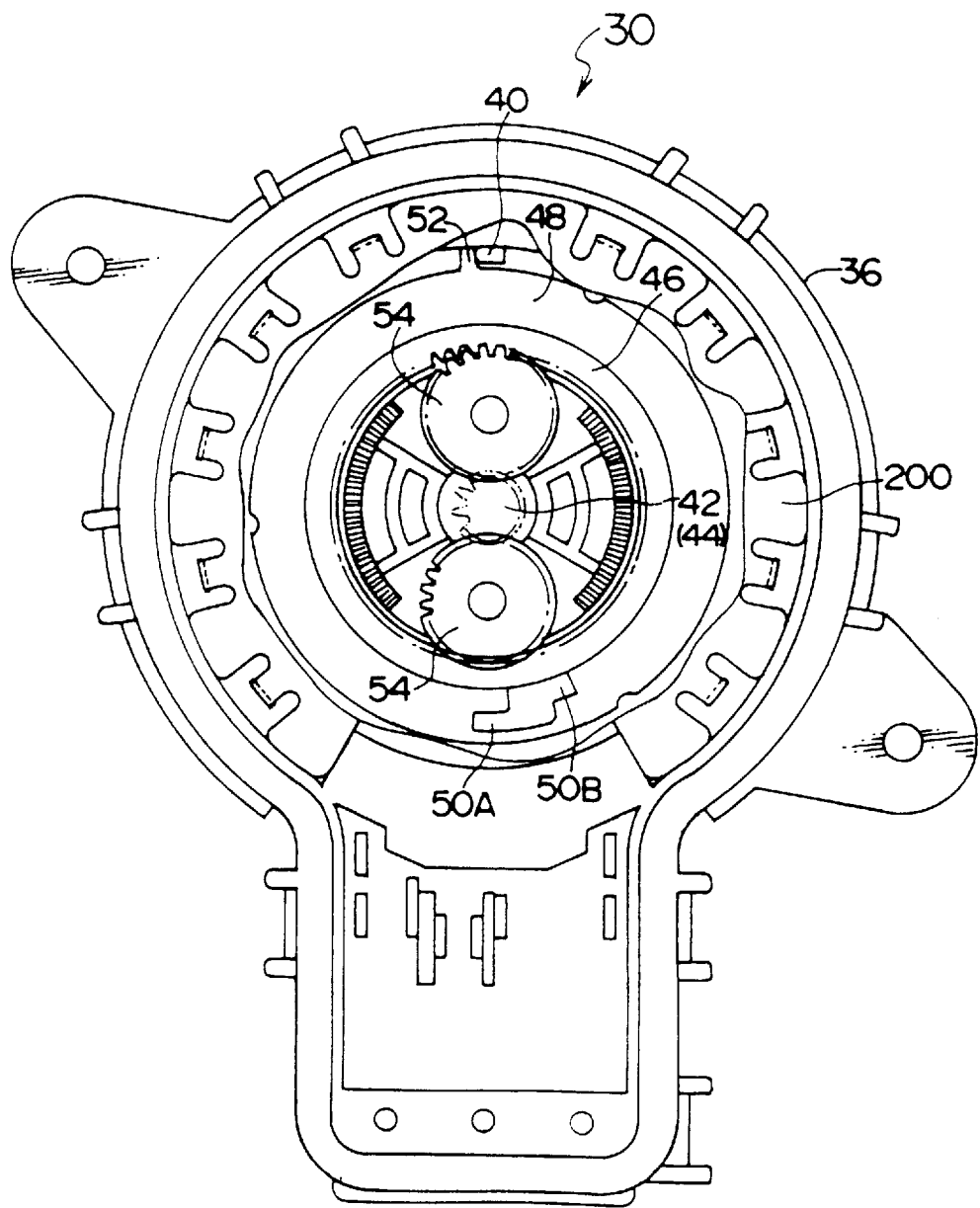
FIG. 8 is a partially broken plan view of the position detecting device relating to the embodiment of the present invention.

A ring gear 46 forming a portion of the planetary gear group is disposed at the periphery of the connecting shaft 42 so as to oppose the sun gear 44. The ring gear 46 is accommodated in the cover plate 36 so as to be rotatable. As illustrated in detail in FIGS. 9A and 9B, a flange portion 48 is formed integrally at the periphery of the ring gear 46. The flange portion 48 is a conductive plate formed integrally with the ring gear 46. Moving contacts 50A, 50B are provided at a portion of the peripheral surface of the flange portion 48 at the side opposite the cover plate 36. The moving contacts 50A, 50B are a non-conductive portion formed in a two-step circular-arc shape, and are formed substantially coplanarly with the flange portion 48. A projecting portion 52 is formed at a portion of the periphery of the flange portion 48. The projecting portion 52 corresponds to the projection 40 formed at the cover plate 36. At the point in time when the ring gear 46 (the flange portion 48) is rotated in the forward direction (in the direction of arrow A in FIG. 1) and reaches a predetermined rotational position, the projecting portion 52 abuts the projection 40 (the state illustrated in FIGS. 5 and 8) such that further rotation of the ring gear 46 in the forward direction is prevented.

Figure 10A:
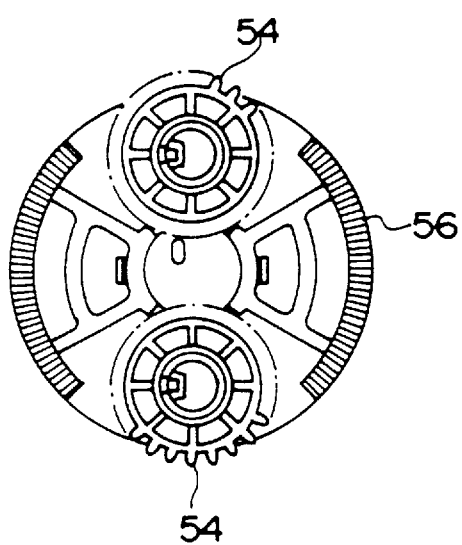
FIG. 10A is a plan view illustrating planetary gears, a carrier, and a wave washer of the position detecting device relating to the embodiment of the present invention.
Figure 10B:
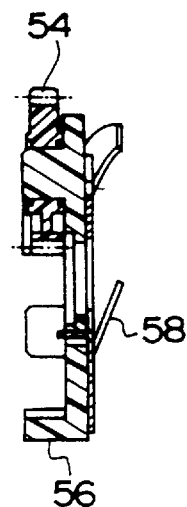
FIG. 10B is a sectional view illustrating the planetary gears, the carrier, and the wave washer of the position detecting device relating to the embodiment of the present invention.
Figure 14B:
FIG. 14B is a sectional view illustrating the protective plate of the position detecting device relating to the embodiment of the present invention.
Figure 14A:
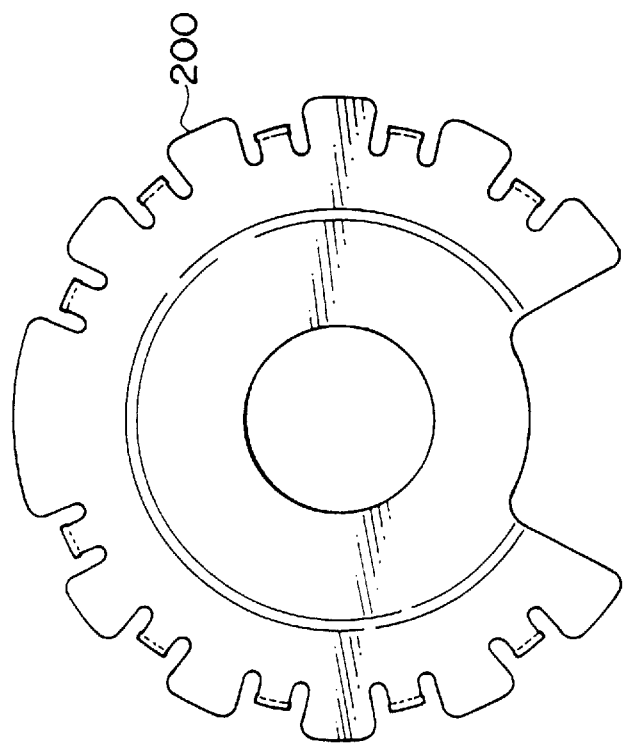
FIG. 14A is a plan view illustrating a protective plate of the position detecting device relating to the embodiment of the present invention.

The two planetary gears 54 are disposed between the sun gear 44 and the inner peripheral portion of the ring gear 46. As shown in detail in FIGS. 10A and 10B, the planetary gears 54 are rotatably supported by a carrier 56, and mesh with the ring gear 46 and the sun gear 44. Namely, the sun gear 44, the ring gear 46 and the planetary gears 54 form a planetary gear group which can decelerate and transmit the rotation of the connecting shaft 42 (i.e., the shaft 20). For example, in a state in which the carrier 56 is held and revolution of the planetary gears 54 is prevented, rotation of the connecting shaft 42 (i.e., the shaft 20) can be decelerated and transmitted to the ring gear 46.

In the present embodiment, the speed reducing ratio of the planetary gear group formed by the sun gear 44, the ring gear 46 and the planetary gears 54 is 5.2:1. During one stroke of the window glass (i.e., during the time the sun gear 44 rotates 3 to 4.5 times), the ring gear 46 rotates less than one complete rotation at all of the window glasses.

The speed reducing ratio of the planetary gear group is not limited to 5.2:1, and can be set arbitrarily as desired.

The planetary gear group formed by the sun gear 44, the ring gear 46 and the planetary gears 54 is covered by the cover plate 36 and is held by a protective plate 200 so as to be prevented from falling out from the cover plate 36. A wave washer 58, which forms a portion of a clutch mechanism, and a washer 59 are disposed between the cover plate 36 and the carrier 56. The wave washer 58 is attached integrally to the carrier 56. The washer 59 is press-fit integrally at the inner peripheral surface of the cover plate 36. The wave washer 58 abuts the washer 59 in a compressed state. The wave washer 58 always pushes the carrier 56, and the carrier 56 abuts the protective plate 200. As a result, usually, rotation of the carrier 56 is prevented due to the pushing force of the wave washer 58 (the frictional force between the carrier 56 and the protective plate 200, and the frictional force between the wave washer 58 and the washer 59), and the planetary gears 54 are maintained in a state in which revolution thereof is prevented. However, in the state in which the projecting portion 52 of the flange portion 48 of the ring gear 46 abuts the projection 40 and further forward direction rotation of the ring gear 46 is prevented, the forward direction rotational force of the sun gear 44, which exceeds the pressing force (holding force) of the carrier 56, is applied, and the wave washer 58 releases the holding of the carrier 56 so that revolution of the planetary gears 54 becomes possible. More specifically, after the projecting portion 52 of the flange portion 48 has abutted the projection 40, the wave washer 58 can cut off the transmission of the forward direction rotational force from the sun gear 44 (the shaft 20) to the ring gear 46. Accordingly, in a state in which the projecting portion 52 abuts the projection 40 and rotation of the ring gear 46 is prevented, when the sun gear 44 (the shaft 20) rotates in the forward direction (in the direction of attempting to rotate the ring gear 46 in the forward direction), only the planetary gears 54 revolve.

A pair of fixed contacts 60A, 61A and a pair of fixed contacts 60B, 61B are mounted to the cover plate 36. The fixed contacts 60A, 61A and the fixed contacts 60B, 61B form a contact plate of two groups having elasticity. As illustrated in detail in FIGS. 12A and 12B, the fixed contact 60A and the fixed contact 60B are formed integrally, and the fixed contact 61A and the fixed contact 61B are formed integrally. The two groups of fixed contacts have respectively different configurations. More specifically, the length $L_1$ of the fixed contact 60A and the width $W_1$ of the proximal end portion thereof, and the length $L_2$ of the fixed contact 60B and the width $W_2$ of the proximal end portion thereof are such that $L_1 \neq L_2$, $W_1 \neq W_2$. The spring constants of the fixed contact 60A and the fixed contact 60B are set to be respectively different.

Similarly, the length $L_3$ of the fixed contact 61A and the width $W_3$ of the proximal end portion thereof and the length $L_4$ of the fixed contact 61B and the width $W_4$ of the proximal end portion thereof are such that $L_3 \neq L_4$, $W_3 \neq W_4$. The spring constants of the fixed contact 61A and the fixed contact 61B are set to be respectively different.

Figure 4:
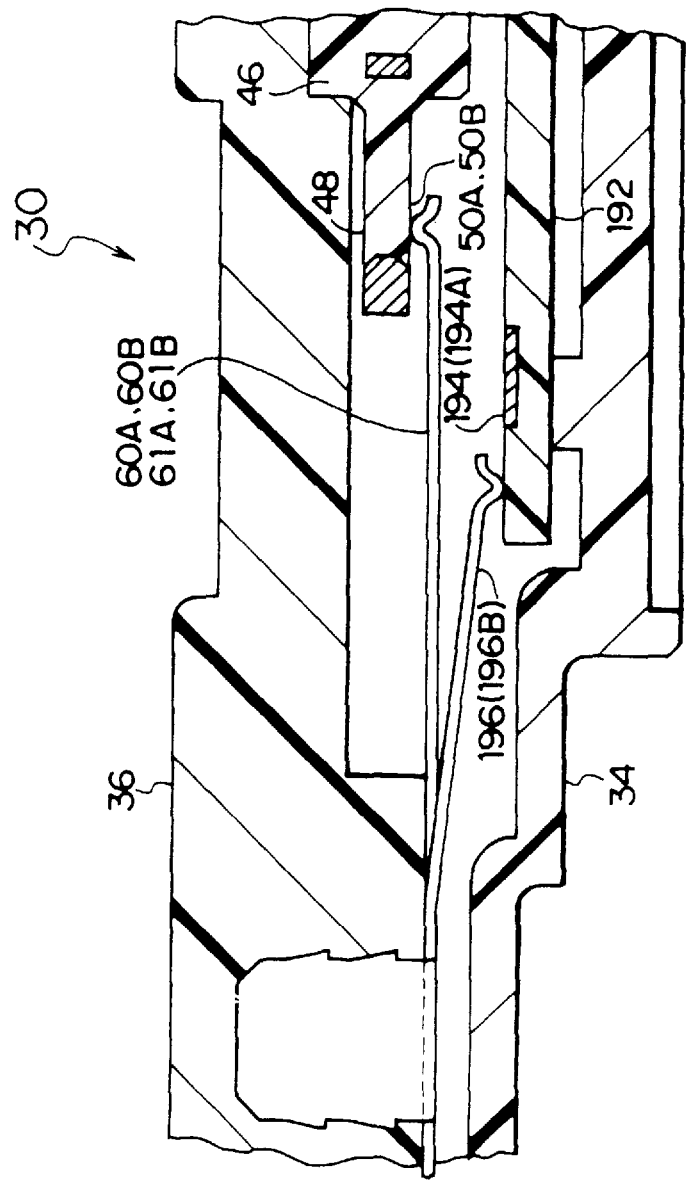
FIG. 4 is an enlarged sectional view illustrating the corresponding relationship between a ring gear and a fixed contact of the position detecting device relating to the embodiment of the present invention.

Ones of ends of the fixed contacts 60A, 61A and fixed contacts 60B, 61B are fixed to the cover plate 36, whereas the respective distal ends thereof extend toward the flange portion 48 of the ring gear 46. The distal end portions elastically abut the flange portion 48 (the peripheral surface thereof at the side opposite the cover plate 36). More specifically, as illustrated in detail in FIG. 4, the fixed contacts 60A, 61A and the fixed contacts 60B, 61B press-contact the flange portion 48 (the moving contacts 50A, 50B) of the ring gear 46 from the side opposite the cover plate 36.

Figure 6:
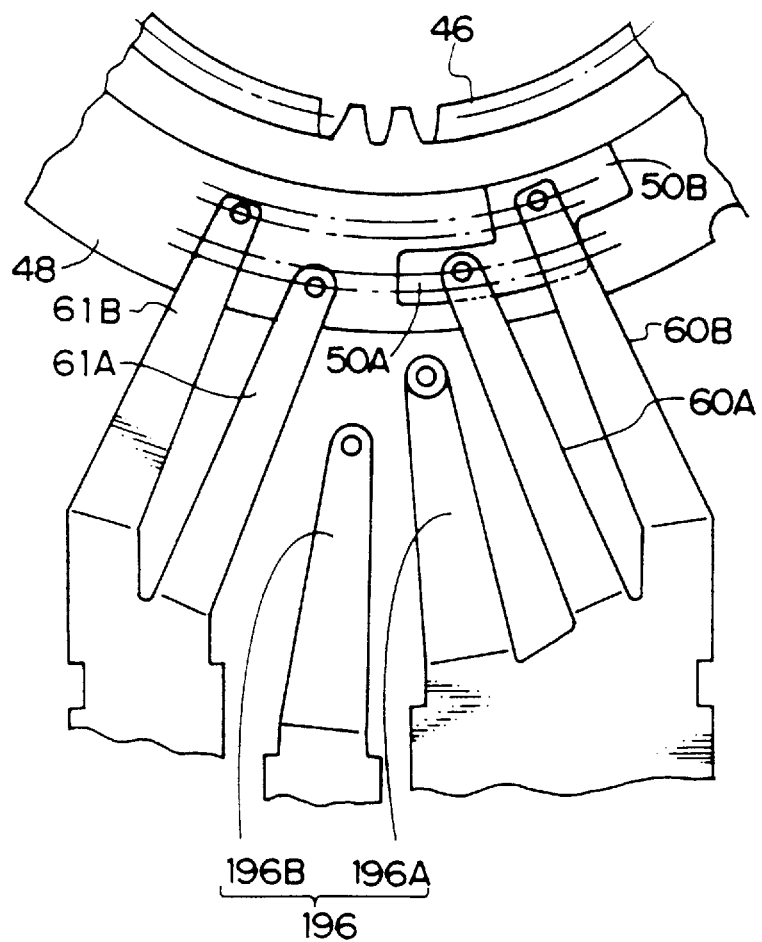
FIG. 6 is a plan view illustrating the corresponding relationship between the fixed contacts and moving contacts of the position detecting device relating to the embodiment of the present invention.

As shown in detail in FIG. 6, the fixed contacts 60A, 61A correspond to the moving contact 50A, and the fixed contacts 60B, 61B correspond to the moving contact 50B. The fixed contacts 60A, 61A and the fixed contacts 60B, 61B contact the moving contacts 50A, 50B at predetermined rotational positions of the ring gear 46.

The respective press-contact positions of the fixed contact 60A and the fixed contact 61A, which positions correspond to the moving contact 50A (and the flange portion 48), are set so as to be offset from one another in the radial direction of the ring gear 46, such that the loci of sliding of the fixed contact 60A and the fixed contact 61A are respectively different. Similarly, the respective press-contact positions of the fixed contact 60B and the fixed contact 61B, which positions correspond to the moving contact 50B (and the flange portion 48), are set so as to be offset from one another in the radial direction of the ring gear 46, such that the loci of sliding of the fixed contact 60B and the fixed contact 61B are respectively different.

The fixed contacts 60A, 61A and the fixed contacts 60B, 61B are electrically connected to the control circuit of the power window device. Due to the moving contacts 50A, 50B contacting both of the fixed contacts 60A, 60B such that there is a non-conductive state, the rotational position of the ring gear 46, i.e., the rotational position of the sun gear 44, i.e., the rotational position of the shaft 20, can be detected. This detected rotational position is used in controlling the rotation of the motor 10, as will be described later.

In the present embodiment, as illustrated in FIG. 7, the dimensions of the respective portions are set such that, for example, at the point in time when a window glass reaches a position which is 4 mm lower than the top end stop position, the projecting portion 52 reaches an upstream side position at a predetermined angle of rotation A from the position at which the projecting portion 52 abuts the projection 40, and further, at this point in time, the moving contacts 50A, 50B contact the fixed contacts 60A, 60B such that there is a non-conductive state, and thereafter, the non-conductive state is maintained until the projecting portion 52 abuts the projection 40.

The fixed contacts 60A, 61A are used as a sub contact group, and the fixed contacts 60B, 61B are used as a main contact group. With regard to angles of rotation $\alpha$ and $\beta$ (i.e., the positions at which the moving contacts 50A, 50B are formed) of the ring gear 46 (the flange portion 48) in a state in which the fixed contacts contact the moving contacts 50A, 50B, the target value of the dimension of the angle of rotation $\beta$ (the position at which the moving contact 50B is formed) corresponding to the fixed contact 60B is set greater than the target value of the angle of rotation $\alpha$ (the position at which the moving contact 50A is formed) corresponding to the fixed contact 60A. More specifically, the fixed contact 60A, which is a member of the sub contact group, contacts the moving contact 50A and is set in a non-conductive state earlier than the fixed contact 60B, which is a member of the main contact group, contacts the moving contact 50B and is set in a non-conductive state. As a result, if the accuracy of the main contact group deteriorates (i.e., if position detecting is carried out by the sub contact group), because the target value of the dimension of the sub contact group is set smaller than that of the main contact group, the sub contact group detects the position earlier than the main contact group detects the position (i.e., the sub contact group detects the position at the safe side). Therefore, the reliability of position detection does not deteriorate.

In accordance with the above-described structure, the fixed contacts 60A, 61A are the sub contact group, and the fixed contacts 60B, 61B are the main contact group. However, it is possible to use the fixed contacts 60A, 61A as the main contact group and the fixed contacts 60B, 61B as the sub contact group.

Further, the position of the moving body may be detected by the following structure which is a reverse case of the above-described structure: at the point in time when the window glass reaches a position 4 mm beneath the top edge stop position and the projecting portion 52 reaches a position upstream, by a predetermined angle of rotation A, from the position at which the projecting portion 52 abuts the projection 40, the moving contacts 50A, 50B contact the fixed contacts 60A, 61A and the fixed contacts 60B, 61B, and are in a conductive state. Moreover, it is not absolutely necessary to, after the non-conductive state or conductive state has been attained, electrically maintain this non-conductive state or conductive state as in the above-described structure. It can be determined that the predetermined rotational position has been reached by detecting a trigger signal which is outputted by the moving contacts 50A, 50B contacting the fixed contacts 60A, 61A and the fixed contacts 60B, 61B.

The position detecting device 30 includes a pulse plate 192 serving as a pulse generating means and a sliding contact 196 serving as a pulse detecting means.

As illustrated in detail in FIGS. 13A and 13B, the pulse plate 192 is formed as a thin circular plate. The connecting shaft 42 is press-fit into and integrally fixed to a fitting hole 198 formed in the central portion of the pulse plate 192. Accordingly, the pulse plate 192 always rotates integrally with the connecting shaft 42. A conductive portion 194 is provided at the periphery of the pulse plate 192 along the peripheral direction of the pulse plate 192. The conductive portion 194 is formed by a ring-shaped first conductive portion 194A and second conductive portions 194B which are adjacent to the first conductive portion 194A and are a series of pulse-shaped convex and concave portions.

The base portion of the sliding contact 196 is fixed to the cover plate 36 and extends toward the conductive portion 194 of the pulse plate 192. The sliding contact 196 is formed by an input contact 196A, which always contacts the first conductive portion 194A of the conductive portion 194, and an output contact 196B, which contacts the second conductive portions 194B of the conductive portion 194. As the pulse plate 192 rotates, a pulse signal can be detected. The detected pulse signal is used in controlling the position of the moving body (the window glass).

The conductive portion 194 may be provided on the peripheral side wall of the pulse plate 192 rather than on the top surface thereof. In this case, the sliding contact 196 is fixed to the cover plate 36 so as to oppose the peripheral side wall of the pulse plate 192.

The protective plate 200 is disposed between the pulse plate 192 and the ring gear 46 (the flange portion 48). The peripheral portion of the protective plate 200 is held by and fixed to the cover plate 36. The protective plate 200 holds the ring gear 46, the carrier 56 and the like so as to prevent these members from falling out from the cover plate 36. By interposing the protective plate 200 between the pulse plate 192 and the ring gear 46 (the flange portion 48), the protective plate 200 prevents the pulse plate 192 and the ring gear 46 from being contacted unnecessarily and limits the movement thereof.

Figure 15:
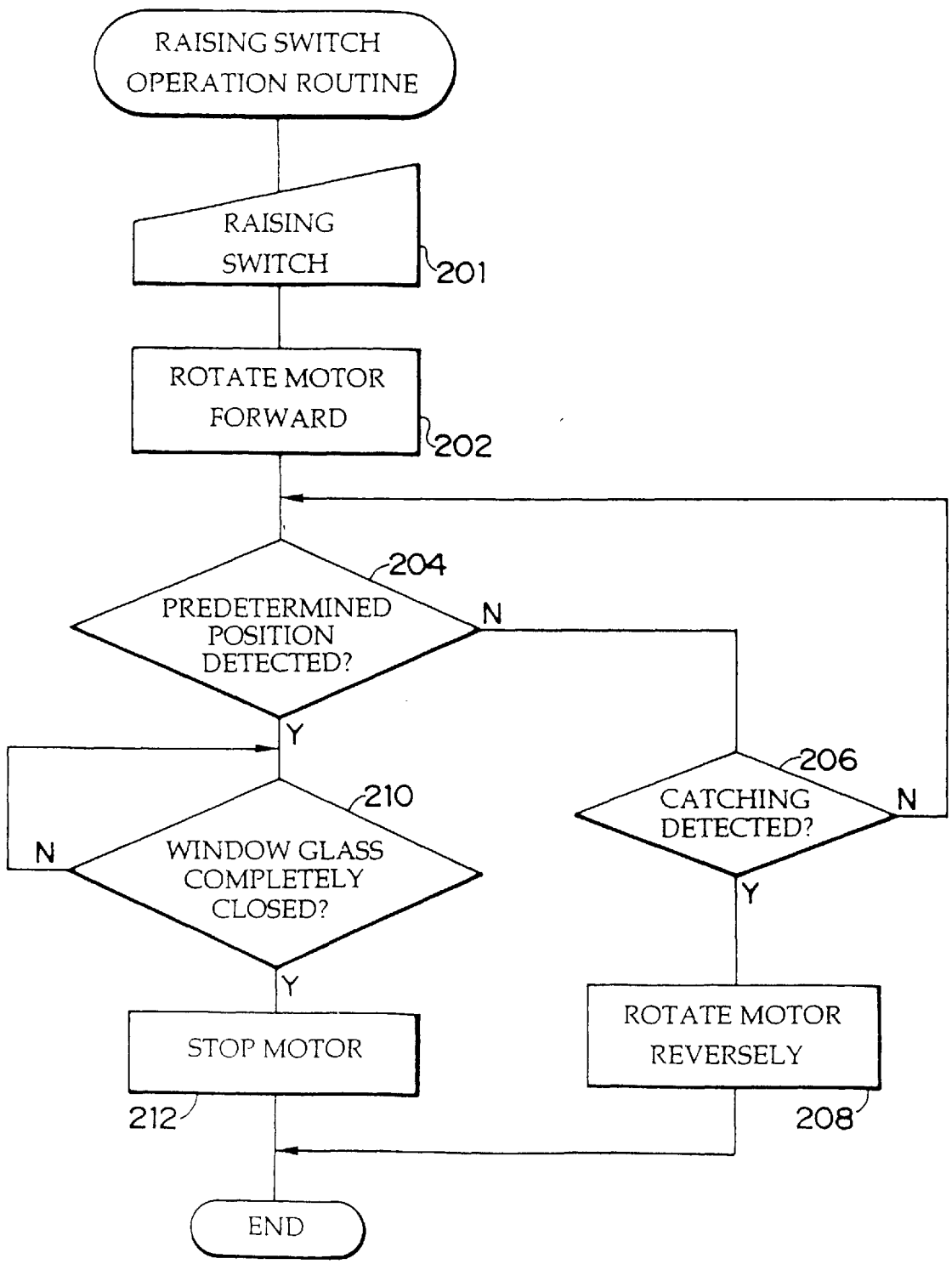
FIG. 15 is a flowchart for explaining control at the time that a raising switch of a power window device, to which the position detecting device relating to the embodiment of the present invention is applied, is operated and a window glass is raised.

Operation of the present embodiment will be described hereinafter with reference to the flowchart in FIG. 15 by an example of a case in which a raising switch of a power window device is operated and a window glass is raised.

At the above-described motor 10 and position detecting device 30, when the raising switch of the power window device is operated in step 201, in step 202, the motor 10 is operated and the shaft 20 rotates, thereby operating the window regulator so that the window glass is raised.

Usually (while the window glass is being raised), the carrier 56 is pressed and held by the wave washer 58, and revolution of the planetary gears 54 is prevented. Accordingly, as the shaft 20 rotates, the rotating force of the connecting shaft 42 (i.e., the sun gear 44) is decelerated and transmitted to the ring gear 46 via the planetary gears 54, and the ring gear 46 is gradually rotated in the forward direction.

Next, in step 204, the position detecting device 30 detects whether a predetermined rotational position of the motor 10 has been reached, i.e., whether the window glass has reached a predetermined position (a position 4 mm beneath the top edge stop position).

More specifically, at the position detecting device 30, as the shaft 20 rotates, the rotating force of the connecting shaft 42 (i.e., the sun gear 44) is decelerated and transmitted to the ring gear 46 via the planetary gears 54, and the ring gear 46 is gradually rotated in the forward direction. If the window glass has not reached the position 4 mm beneath the top edge stop position, the projecting portion 52 is far apart from the projection 40, and the moving contacts 50A, 50B are separated from the fixed contacts 60A, 61A and the fixed contacts 60B, 61B and are in a non-conductive state. The rotational position of the shaft 20 is thereby detected (i.e., it is detected that the window glass has not reached the position 4 mm beneath the top edge stop position). In this case, the operating of the motor 10 is continued and the routine proceeds to step 206 where it is determined whether a foreign object has been caught on the basis of a change in the pulse signal generated by the conductive portion 194 and the sliding contact 196 which accompanies the rotation of the pulse plate 192, or on the basis of the lock current of the motor 10, or the like. When the catching of a foreign object is detected, in step 208, the motor 10 is rotated in the reverse direction, and the window glass is lowered. In step 206, if catching of a foreign object is not detected, the routine returns to step 204.

In step 204, when the window glass reaches a position 4 mm beneath the top edge stop position, the projecting portion 52 reaches a position which is upstream, by a predetermined angle of rotation, from the position at which the projecting portion 52 abuts the projection 40. At this point in time, the moving contacts 50A, 50B contact the fixed contacts 60A, 60B and are in a non-conductive state. In this way, the rotational position of the shaft 20 is detected (i.e., it is detected that the window glass has reached a position 4 mm beneath the top edge stop position).

When it is detected in step 204 that the shaft 20 of the motor 10 has reached a predetermined rotational position, i.e., that the window glass has reached a predetermined position, the routine proceeds to step 210 while operating of the motor 10 is continued. At this time, the relative contact positions of the moving contacts 50A, 50B and the fixed contacts 60A, 60B, 61A, 61B are changing, but the non-conductive state is maintained.

In step 210, it is judged whether the window glass is completely closed, on the basis of the pulse signal which accompanies rotation of the pulse plate 192 or on the basis of the lock current of the motor 10 or the like. When the window glass is completely closed, the motor 10 is stopped in step 212, and the process ends.

In this way, in the position detecting device 30, the rotational position of the shaft 20, i.e., the position of the window glass (i.e., whether the window glass has reached a position 4 mm lower than the top edge stop position), can accurately be detected by the moving contacts 50A, 50B, which rotate together with the ring gear 46, and the two groups of fixed contact pairs which are the fixed contacts 60A, 61A and the fixed contacts 60B, 61B.

Further, in the position detecting device 30, at the time of assembly into the vehicle body, by rotating the shaft 20 of the motor 10 sufficiently in the forward direction, an initial state in which the moving contacts 50A, 50B contact the fixed contacts 60A, 60B can be set automatically.

More specifically, at the time of assembly into the vehicle body, when the shaft 20 of the motor 10 is rotated sufficiently in the forward direction, first, the projecting portion 52 of the flange portion 48 of the ring gear 46 abuts the projection 40, and further rotation of the ring gear 46 in the forward direction is prevented. In this state, if the shaft 20 is rotated even further, rotational force of the sun gear 44, which exceeds the pressing force (holding force) of the carrier 56, is applied such that the wave washer 58 releases the holding of the carrier 56, and revolution of the planetary gears 54 is permitted. More specifically, after the projecting portion 52 of the flange portion 48 abuts the projection 40, the wave washer 58 can cut off the transmission of forward direction rotational force from the sun gear 44 (the shaft 20) to the ring gear 46. Therefore, in the state in which the projecting portion 52 abuts the projection 40 and rotation of the ring gear 46 is prevented, when the sun gear 44 (the shaft 20) rotates in the forward direction (the direction of rotating the ring gear 46 in the forward direction), only the planetary gears 54 revolve. Accordingly, after the projecting portion 52 abuts the projection 40 and the moving contacts 50A, 50B contact the fixed contacts 60A, 60B, even if the shaft 20 of the motor 10 rotates in the forward direction, the ring gear 46 does not move, and the contacting state of the moving contacts 50A, 50B and the fixed contacts 60A, 60B is maintained. Namely, by rotating the shaft 20 of the motor 10 sufficiently in the forward direction, the initial state, in which the projecting portion 52 abuts the projection 40 and the moving contacts 50A, 50B contact the fixed contacts 60A, 60B, is automatically set.

In the position detecting device 30, the position separated by a predetermined distance (4 mm in the present embodiment) from the completely closed position of the window glass (the upper limit of movement of the window glass) can be mechanically stored (i.e., detection is carried out on the basis of the position 4 mm beneath the top edge stop position), regardless of whether the window glass has reached the completely closed position (the upper limit of movement). Therefore, control of the movement of the window glass can be reliably effected without error. For example, conventionally, in a structure in which the rotational frequency of the armature of the motor is detected and the position of the window glass is detected, resetting is carried out on the basis of the completely closed position of the window glass. However, if the window glass was stopped when it had not yet reached the actual upper limit of movement due to a drop in the power source voltage or an increase in the frictional resistance between the window glass and the window frame or for some other reason, resetting would be carried out with this unauthentic stop position as the completely closed position of the window glass. Accordingly, in this case, because control of the driving of the motor would be carried out on the basis of this unauthentic window glass completely closed position, the error would be quite great. In contrast, in the position detecting device 30 of the present invention, even in a case in which the window glass is stopped without reaching the actual completely closed position (the upper limit of the range of movement), thereafter, the window glass passing the position 4 mm from the actual completely closed position is accurately detected at the time the window glass passes this position. Accordingly, control of the movement of the window glass can be carried out reliably and without error. In particular, in a wire-type window regulator device, the error in position control due to the slack of the wire is great. However, the error caused by the slack in the wire can be compensated for by using the position detecting device 30, and highly accurate control is possible.

In this way, in the position detecting device 30, by rotating the shaft 20 of the motor 10 sufficiently in the forward direction at the time of assembly into the vehicle body, the initial state, in which the projecting portion 52 abuts the projection 40 and the moving contacts 50A, 50B contact the fixed contacts 60A, 60B, is set automatically. The initial positions can be set easily without complicated adjustment of the installation positions at the time of assembly or complicated resetting after assembly. Further, control of the movement of the window glass can be carried out reliably and without error.

Further, in the position detecting device 30 relating to the present embodiment, a pulse signal is detected by the output contact 196B repeatedly contacting and not contacting the second conductive portions 194B of the conductive portion 194 as the pulse plate 192 rotates. Accordingly, the rotational speed of the shaft 20 of the motor 10 can be detected linearly on the basis of this detected pulse signal.

Therefore, for example, in a case in which the position detecting device 30 is used in a vehicle power window device having a catch-preventing function, a predetermined position and the moving speed of the window glass can be linearly detected and controlled at all times.

Moreover, in the position detecting device 30, the fixed contacts 60A, 61A and the fixed contacts 60B, 61B fixed to the cover plate 36 are press-contacted by the flange portion 48 (the moving contacts 50A, 50B) of the ring gear 46 from the side opposite the cover plate 36. Therefore, the assemblability of the parts improves.

More specifically, the assembly of parts of the position detecting device 30 is carried out with the cover plate 36 being used as a reference. First, the washer 59 is press-fit integrally with and fixed to the inner peripheral surface of the cover plate 36. Next, the ring gear 46 is provisionally installed at the cover plate 36. The planetary sub-assembly formed by the planetary gears 54, the carrier 56 and the wave washer 58 is inserted into the ring gear 46 such that the planetary gears 54 mesh with the ring gear 46. In this state, the protective plate 200 is press-fit into and fixed to the cover plate 36. Then, the fixed contacts 60A, 61A, the fixed contacts 60B, 61B and the sliding contact 196 are press-fit into and fixed to the cover plate 36.

The sun gear 44 (the shaft 20), which is fixed integrally to the pulse plate 192, is inserted and meshes with the planetary gears 54. In this state, the base plate 34 is fit with the cover plate 36, and the assembly of the parts is thereby completed.

In this way, in the position detecting device 30, when the ring gear 46 is provisionally installed by using the cover plate 36 as a reference, it is possible to install the fixed contacts 60A, 61A and the fixed contacts 60B, 61B after the ring gear 46 is installed. As a result, in the state in which the ring gear 46 is provisionally installed, urging force (press-contact force) of the fixed contacts 60A, 61A and the fixed contacts 60B, 61B is not applied to the ring gear 46. Accordingly, the ring gear 46 does not rise while in its provisionally installed state, and the axis does not shift. Moreover, in the state in which the ring gear 46, the fixed contacts 60A, 61A, and the fixed contacts 60B, 61B are provisionally installed, urging force (press-contact force) of the fixed contacts 60A, 61A and the fixed contacts 60B, 61B acts on the flange portion 48 of the ring gear 46 (i.e., on the moving contacts 50A, 50B). This urging force (press-contact force) of the fixed contacts 60A, 61A and the fixed contacts 60B, 61B acts in a direction of pushing the ring gear 46 toward the cover plate 36. Accordingly, in this state as well, the ring gear 46 is reliably held by the urging force (press-contact force) of the fixed contacts 60A, 61A and the fixed contacts 60B, 61B, and does not rise, and the axis does not shift. In this way, accurate positioning at the time of installing the ring gear 46 is not prevented, and the assemblability is greatly improved.

The position detecting device 30 includes two contact groups. The fixed contacts 60A, 61A are used as the sub contact group, and the fixed contacts 60B, 61B are used as the main contact group. As a result, reliability is greatly improved.

In the position detecting device 30, the fixed contacts 60A, 61A are used as the sub contact group, and the fixed contacts 60B, 61B are used as the main contact group. The target value of the dimension of the angle of rotation β (the position at which the moving contact 50B is formed) corresponding to the fixed contact 60B is set greater than the target value of the dimension of the angle of rotation α (the position at which the moving contact 50A is formed) corresponding to the fixed contact 60A. The fixed contact 60A, which is one member of the sub contact group, contacts the moving contact 50A earlier than the fixed contact 60B, which is one member of the main contact group, contacts the moving contact 50B. The fixed contact 60A is thereby set in a non-conductive state earlier than the fixed contact 60B. Accordingly, if the accuracy of the main contact group deteriorates (i.e., if position detection is carried out by the sub contact group), the sub contact group detects the position earlier than the main contact group detects the position (i.e., the sub contact group detects the position at the safe side), and the reliability of position detection does not deteriorate.

In the position detecting device 30, the press-contact positions of the fixed contact 60A and the fixed contact 61A against the moving contact 50A (and the flange portion 48) and the press-contact positions of the fixed contact 60B and the fixed contact 61B against the moving contact 50B (and the flange portion 48) are set so as to be offset in the radial direction of the ring gear 46, and the loci of sliding are respectively different. As a result, the durability (wear resistance) of the respective contacts improves. Further, wear of the respective contacts is decreased even in a case in which the rotation of the ring gear 46 is repeated and the sliding of the moving contact 50A (the flange portion 48) and the pair of fixed contacts 60A, 61A as well as the moving contact 50B (the flange portion 48) and the pair of fixed contacts 60B, 61B is repeated to the extent that the moving body (the window glass or the sunroof) moves. Accordingly, high accuracy of position detection and reliability can be maintained.

In the position detecting device 30, the fixed contact 60A and the fixed contact 60B, as well as the fixed contact 61A and the fixed contact 61B, have respectively different configurations and respectively different spring constants. Therefore, the fixed contact 60A and the fixed contact 60B, as well as the fixed contact 61A and the fixed contact 61B, can be prevented from resonating together at the same vibrational frequency. Accordingly, reliability can be greatly improved for this reason as well.

In the above-described embodiment, an example is described in which the position detecting device 30 is applied directly to a motor 10 of a power window device. However, the position detecting device 30 is not limited to being applied directly to such a motor 10, and can be applied to other mechanisms and other regions as well. For example, the position detecting device 30 may be provided at the arm rotating/supporting shaft of an X-arm-type window regulator device, or may be provided at a pulley for taking up a wire in a wire-type window regulator device. In these cases as well, not only can the window glass position be detected with high precision and highly accurate movement control be made possible, but also, the initial positions can be set easily without complicated adjustment of the installation positions at the time of assembly or complicated resetting after assembly.

In the above-described embodiment, the position detecting device 30 detects and controls the rotational position of the output shaft (the shaft 20) of the motor 10 for a power window device. However, the present invention is not limited to the same, and is also applicable to a case in which a position of a moving body which moves reciprocally (e.g., a sunroof which moves on guide rails or the like) is directly detected and controlled.

The present invention described above has superior effects in that the position of a moving body such as a window glass or a sunroof or the like can be detected with high accuracy, initial positions can be set without complicated adjustment, these features can be realized by a simple structure and at a low cost, assemblability can be greatly improved, durability (wear resistance) can be improved, wear of moving contacts and fixed contacts can be reduced, and high accuracy of position detection and reliability can be maintained.

Another embodiment of the present invention will be described hereinafter.

Figure 9B:
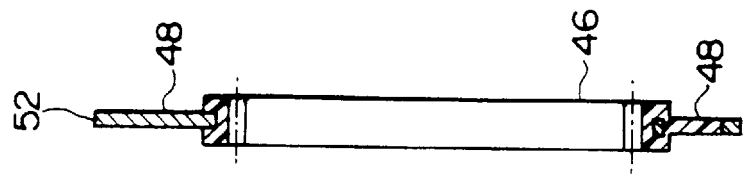
FIG. 9B is a sectional view illustrating the ring gear of the position detecting device relating to the embodiment of the present invention.
Figure 9A:
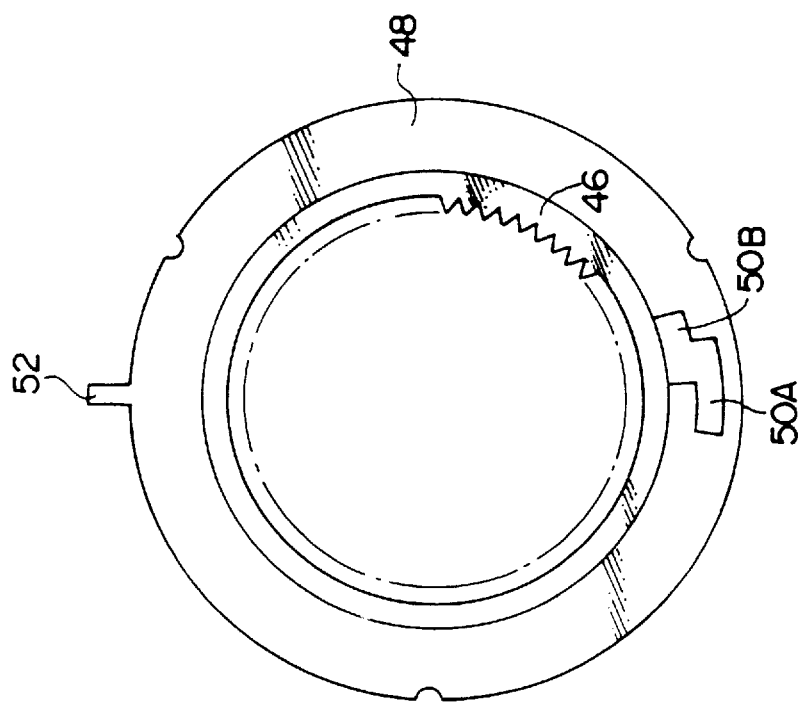
FIG. 9A is a plan view illustrating the ring gear of the position detecting device relating to the embodiment of the present invention.

Only portions which differ from those of the above-described embodiment will be described. As illustrated in FIGS. 9A and 9B, the flange portion 48 formed at the periphery of the ring gear 46 is a conductive plate formed integrally with the peripheral wall of the ring gear 46, such that the obverse and reverse sides of the ring gear 46 and the flange portion 48 are symmetrical. The moving contacts 50A, 50B formed at a portion of the peripheral surface of the flange portion 48 are provided at both the obverse and reverse surfaces of the flange portion 48 such that the obverse and reverse sides of the flange portion 48 are symmetrical.

Figure 16:
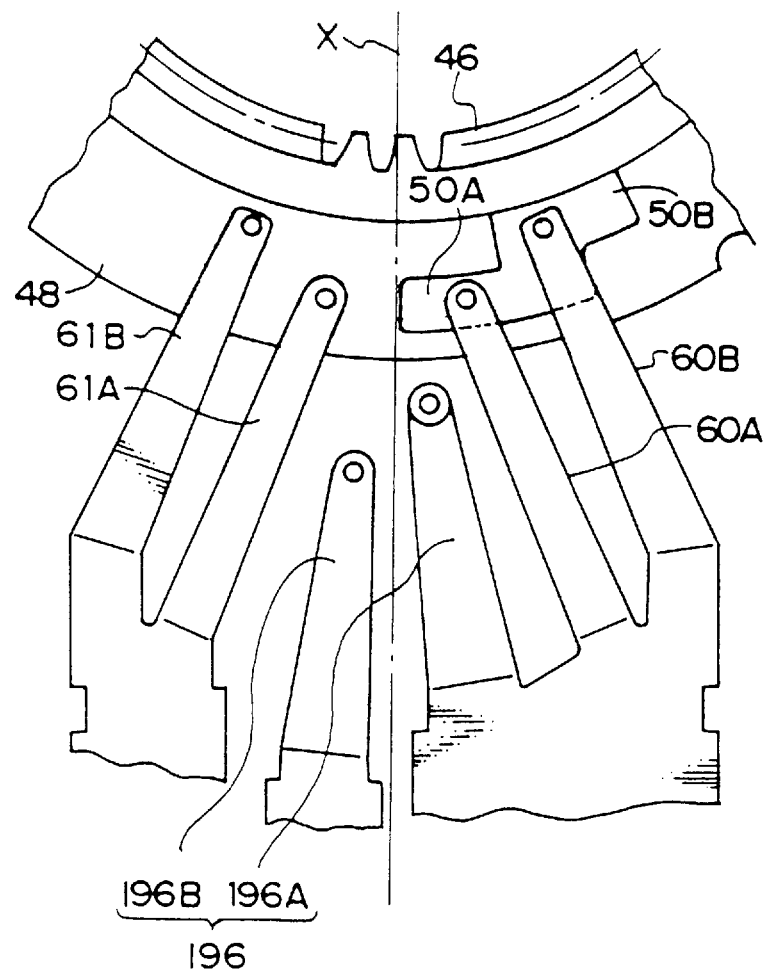
FIG. 16 is a plan view illustrating the corresponding relationship between fixed contacts and moving contacts of a position detecting device relating to another embodiment of the present invention.
Figure 17A:
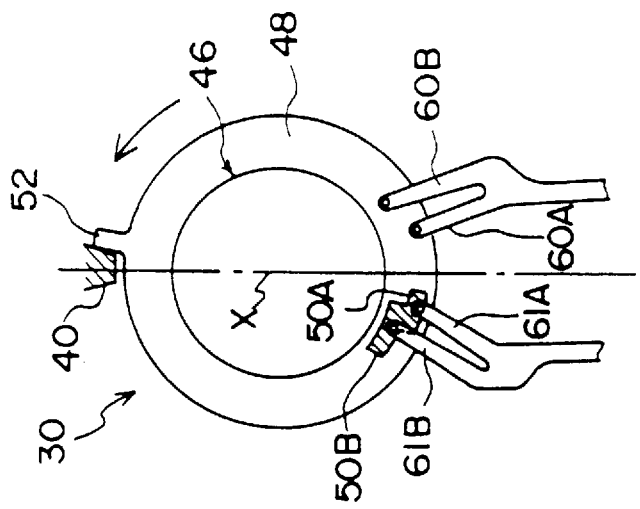
FIGS. 17A and 17B are plan views illustrating the corresponding relationship between the fixed contacts and a ring gear (the moving contacts) of the position detecting device relating to the other embodiment of the present invention.
Figure 17B:
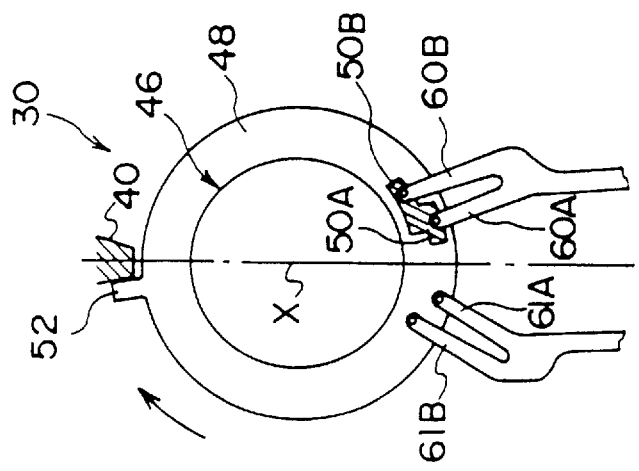
Figure 18A:
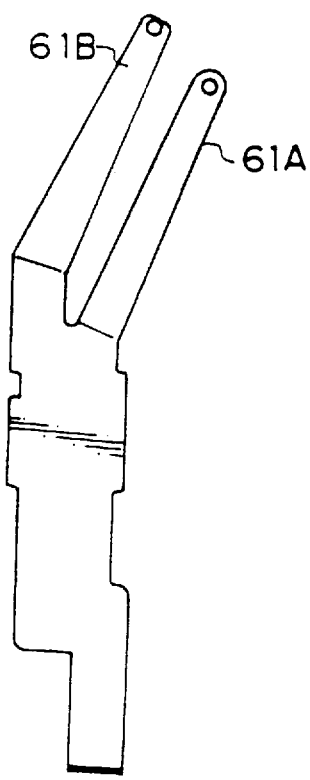
FIGS. 18A and 18B are plan views of the fixed contacts of the position detecting device relating to the other embodiment of the present invention.
Figure 18B:
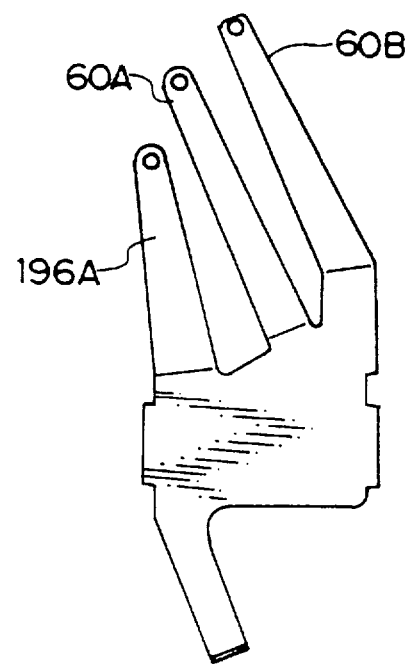

As illustrated in detail in FIGS. 18A and 18B, the pair of fixed contacts 60A, 61A have symmetrical configurations, as do the pair of fixed contacts 60B, 61B. Further, the pair of fixed contacts 60A, 61A are disposed at positions so as to be symmetrical, as are the pair of fixed contacts 60B, 61B. Namely, as illustrated in FIGS. 16, 17A, and 17B, the fixed contact 60A and the fixed contact 61A are shaped so as to have line symmetry and are disposed at positions so as to have line symmetry with respect to an imaginary line X passing through the center of the ring gear 46. Similarly, the fixed contact 60B and the fixed contact 61B are shaped so as to have line symmetry and are disposed at positions so as to have line symmetry with respect to the imaginary line X passing through the center of the ring gear 46.

In the position detecting device 30 of this other embodiment, the fixed contact 60A and the fixed contact 61A are shaped and disposed so as to have line symmetry with respect to the imaginary line X which passes through the center of the ring gear 46. The fixed contact 60B and the fixed contact 61B also are shaped and disposed so as to have line symmetry with respect to the imaginary line X passing through the center of the ring gear 46. As a result, for example, if the position detecting devices 30 are applied to power window devices which are symmetrical at the left and right doors (i.e., if the directions of rotation of the ring gears 46 at the left and right doors are opposite to one another), as illustrated in FIGS. 17A and 17B, the pair of the fixed contact 60A and the fixed contact 61A and the pair of the fixed contact 60B and the fixed contact 61B can be applied to both the left and right doors. Accordingly, the number of parts can be reduced, and the range of application can be greatly increased. Moreover, in the position detecting device 30, because the obverse and reverse sides of the ring gear 46 and the flange portion 48 (the moving contacts 50A, 50B) have symmetrical configurations, in the same way as described above, the ring gear 46 and the flange portion 48 can be applied to both the left and right doors. Accordingly, the number of parts can be reduced even more, and the range of application is greatly increased.

While the embodiments of the present invention as disclosed herein constitute a preferred form, it is to be understood that other forms might be adopted.

What is claimed is:

1. A device for detecting a position of a moving body for detecting a predetermined position of a moving body, comprising:

a planetary gear group having a ring gear which is held rotatably at a cover plate of said device and a planetary gear which meshes with the ring gear, said planetary gear group being operated interlockingly with the moving body due to moving force transmitted from the moving body which moves in forward and reverse directions;

a switch portion having a moving contact provided integrally with the ring gear of said planetary gear group and rotating together with the ring gear, and having a fixed contact fixed to the cover plate and able to contact the moving contact, said switch portion able to detect the predetermined position of the moving body due to on-and-off operation of said switch portion; and a clutch mechanism which usually, by preventing revolution of the planetary gear of said planetary gear group, transmits the moving force of the moving body from the planetary gear to the ring gear so as to rotate the ring gear, and in a state in which said switch portion is operated, said clutch mechanism cuts off transmission of forward direction rotating force from the moving body to the ring gear by permitting revolution of the planetary gear, wherein the fixed contact of said switch portion is made to press-contact the moving contact from a side of the ring gear which side is opposite the side at which the cover plate is disposed.

2. A device for detecting a position of a moving body according to claim 1, further comprising:

pulse generating means provided at said planetary gear group and generating pulses in accordance with operation of said planetary gear group; and pulse detecting means for detecting the pulses generated by said pulse generating means.

3. A device for detecting a position of a moving body for detecting a predetermined position of a moving body, comprising:

a planetary gear group having a ring gear which is held rotatably at a cover plate of said device and a planetary gear which meshes with the ring gear, said planetary gear group being operated interlockingly with the moving body due to moving force transmitted from the moving body which moves in forward and reverse directions;

a switch portion having a moving contact provided integrally with the ring gear of said planetary gear group and rotating together with the ring gear, and having a pair of fixed contacts fixed to the cover plate and able to contact the moving contact, said switch portion able to detect the predetermined position of the moving body due to on-and-off operation of said switch portion; and a clutch mechanism which usually, by preventing revolution of the planetary gear of said planetary gear group, transmits the moving force of the moving body from the planetary gear to the ring gear so as to rotate the ring gear, and in a state in which said switch portion is operated, said clutch mechanism cuts off transmission of forward direction rotating force from the moving body to the ring gear by permitting revolution of the planetary gear, wherein positions at which the pair of fixed contacts of said switch portion contact the moving contact are offset from one another in a radial direction of the ring gear such that loci of sliding of the fixed contacts are respectively different.

4. A device for detecting a position of a moving body according to claim 3, wherein the pair of fixed contacts are formed in respectively different configurations, and have respectively different spring constants.

5. A device for detecting a position of a moving body according to claim 3, wherein the moving contact and the pair of fixed contacts form a contact group, and two contact groups are provided, and each contact group is able to independently detect the predetermined position of the moving body.

6. A device for detecting a position of a moving body according to claim 5, wherein the fixed contacts of the two contact groups are formed in respectively different configurations and have respectively different spring constants.

7. A device for detecting a position of a moving body according to claim 3, further comprising:

pulse generating means provided at said planetary gear group and generating pulses in accordance with operation of said planetary gear group; and pulse detecting means for detecting the pulses generated by said pulse generating means.

8. A device for detecting a position of a moving body according to claim 5, further comprising:

pulse generating means provided at said planetary gear group and generating pulses in accordance with operation of said planetary gear group; and pulse detecting means for detecting the pulses generated by said pulse generating means.

9. A device for detecting a position of a moving body according to claim 6, further comprising:

pulse generating means provided at said planetary gear group and generating pulses in accordance with operation of said planetary gear group; and pulse detecting means for detecting the pulses generated by said pulse generating means.

10. A device for detecting a position of a moving body for detecting a predetermined position of a moving body, comprising:

a planetary gear group having a ring gear which is held rotatably at a cover plate of said device and a planetary gear which meshes with the ring gear, said planetary gear group being operated interlockingly with the moving body due to moving force transmitted from the moving body which moves in forward and reverse directions;

a switch portion having a moving contact provided integrally with the ring gear of said planetary gear group and rotating together with the ring gear, and having a pair of fixed contacts fixed to the cover plate and able to contact the moving contact, said switch portion able to detect the predetermined position of the moving body due to on-and-off operation of said switch portion; and a clutch mechanism which usually, by preventing revolution of the planetary gear of said planetary gear group, transmits the moving force of the moving body from the planetary gear to the ring gear so as to rotate the ring gear, and in a state in which said switch portion is operated, said clutch mechanism cuts off transmission of forward direction rotating force from the moving body to the ring gear by permitting revolution of the planetary gear, wherein at least the pair of fixed contacts of said switch portion are shaped and disposed so as to have line symmetry with respect to an imaginary line passing through a center of the ring gear.

11. A device for detecting a position of a moving body according to claim 10, wherein the ring gear and the moving contact are shaped symmetrically at obverse and reverse surfaces of the ring gear.

12. A device for detecting a position of a moving body according to claim 10, wherein the ring gear has a flange portion at a peripheral side wall portion of the ring gear, and the moving contact is provided at the flange portion.

13. A device for detecting a position of a moving body according to claim 11, wherein the ring gear has a flange portion at a peripheral side wall portion of the ring gear, and the moving contact is provided at the flange portion.

14. A device for detecting a position of a moving body according to claim 12, wherein the ring gear and the flange portion are formed of the same material.

15. A device for detecting a position of a moving body according to claim 13, wherein the ring gear and the flange portion are formed of the same material.

16. A device for detecting a position of a moving body according to claim 12, wherein the ring gear and the moving contact are formed of the same material.

17. A device for detecting a position of a moving body according to claim 13, wherein the ring gear and the moving contact are formed of the same material.

18. A device for detecting a position of a moving body according to claim 16, wherein the ring gear and the moving contact are formed integrally and continuously and of a resin material, and the flange portion is formed of a metal material.

19. A device for detecting a position of a moving body according to claim 17, wherein the ring gear and the moving contact are formed integrally and continuously and of a resin material, and the flange portion is formed of a metal material.

20. A device for detecting a position of a moving body according to claim 10, further comprising:

pulse generating means provided at said planetary gear group and generating pulses in accordance with operation of said planetary gear group; and pulse detecting means for detecting the pulses generated by said pulse generating means.

* * * * *